(12) United States Patent
Veitch et al.

(10) Patent No.: US 10,689,987 B2
(45) Date of Patent: *Jun. 23, 2020

(54) COMPRESSOR ROTOR WITH COATED BLADES

(71) Applicant: PRATT & WHITNEY CANADA CORP., Longueuil (CA)

(72) Inventors: Thomas Veitch, Scarborough (CA); Farid Abrari, Mississauga (CA); Ernest Adique, Brampton (CA); Paul Aitchison, Hamilton (CA); Daniel Fudge, Vaughan (CA); Kari Heikurinen, Oakville (CA); Paul Stone, Guelph (CA); Tibor Urac, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/562,701

(22) Filed: Sep. 6, 2019

(65) Prior Publication Data
US 2020/0018176 A1 Jan. 16, 2020

Related U.S. Application Data

(63) Continuation of application No. 15/707,133, filed on Sep. 18, 2017, now Pat. No. 10,443,411.

(51) Int. Cl.
*F01D 5/14* (2006.01)
*F01D 5/16* (2006.01)
(Continued)

(52) U.S. Cl.
CPC ............. *F01D 5/288* (2013.01); *F01D 5/141* (2013.01); *F01D 5/16* (2013.01); *F01D 5/26* (2013.01);
(Continued)

(58) Field of Classification Search
CPC ... F01D 5/141; F01D 5/16; F01D 5/26; F01D 5/288; F05D 2230/90; F05D 2240/301; F05D 2260/961
See application file for complete search history.

(56) References Cited

U.S. PATENT DOCUMENTS 3,758,233 A * 9/1973 Cross ..................... C23C 4/02
416/229 A
4,492,522 A * 1/1985 Rossmann ........... C23C 30/005
415/200
(Continued)

FOREIGN PATENT DOCUMENTS

DE 102009033618 1/2011
EP 1211382 6/2002
(Continued)

OTHER PUBLICATIONS

European Search Report of Application No. 18194363.0 dated Feb. 11, 2019.
(Continued)

*Primary Examiner* — Erick R Solis
(74) *Attorney, Agent, or Firm* — Norton Rose Fulbright Canada LLP (57) ABSTRACT

A compressor rotor for a gas turbine engine has blades circumferentially distributed around and extending a span length from a central hub. The blades include alternating first and second blades having airfoils with corresponding geometric profiles. The airfoil of the first blade has a coating varying in thickness relative to the second blade to provide natural vibration frequencies different between the first and the second blades.

20 Claims, 5 Drawing Sheets

(51) Int. Cl.
*F01D 5/28* (2006.01)
*F01D 5/26* (2006.01)

(52) U.S. Cl.
CPC .. *F05D 2220/3216* (2013.01); *F05D 2230/90* (2013.01); *F05D 2240/301* (2013.01); *F05D 2260/961* (2013.01); *F05D 2300/133* (2013.01); *F05D 2300/143* (2013.01); *F05D 2300/16* (2013.01)

(56) References Cited

U.S. PATENT DOCUMENTS

| | | | |
|---|---|---|---|
| 4,878,810 | A | 11/1989 | Evans |
| 5,286,168 | A | 2/1994 | Smith |
| 6,042,338 | A | 3/2000 | Brafford et al. |
| 6,059,533 | A * | 5/2000 | Stoker ............. C23C 4/02 415/119 |
| 6,379,112 | B1 | 4/2002 | Montgomery |
| 6,428,278 | B1 | 8/2002 | Montgomery et al. |
| 6,471,482 | B2 | 10/2002 | Montgomery et al. |
| 7,354,243 | B2 | 4/2008 | Harvey |
| 7,690,890 | B2 | 4/2010 | Aotsuka et al. |
| 7,753,652 | B2 | 7/2010 | Truckenmueller et al. |
| 8,043,063 | B2 | 10/2011 | Kelly et al. |
| 8,540,490 | B2 | 9/2013 | Ramakrishnan et al. |
| 8,656,589 | B2 | 2/2014 | Kurt-Elli |
| 8,727,716 | B2 | 5/2014 | Clements et al. |
| 9,097,125 | B2 | 8/2015 | Ghorbani et al. |
| 9,382,916 | B2 | 7/2016 | Schoenenborn |
| 9,410,436 | B2 | 8/2016 | Kulathu et al. |
| 2002/0064458 | A1 | 5/2002 | Montgomery et al. |
| 2002/0067991 | A1 | 6/2002 | Montgomery et al. |
| 2005/0042384 | A1 | 2/2005 | Benedetti et al. |
| 2007/0020101 | A1 | 1/2007 | Balamucki et al. |
| 2007/0175032 | A1 | 8/2007 | Kurt-Elli |
| 2008/0134504 | A1 | 6/2008 | Schoenenborn |
| 2010/0247310 | A1 | 9/2010 | Kelly et al. |
| 2011/0044818 | A1 | 2/2011 | Kuhne et al. |
| 2013/0078084 | A1 * | 3/2013 | Gendrich ............. F01D 5/20 415/173.1 |
| 2013/0189111 | A1 * | 7/2013 | Woehler ............. F01D 5/26 416/220 R |
| 2013/0195652 | A1 * | 8/2013 | Pope ............. F01D 5/141 416/1 |
| 2013/0236319 | A1 | 9/2013 | Rockarts et al. |
| 2014/0050590 | A1 | 2/2014 | Ghorbani Zarimahalleh et al. |
| 2014/0090380 | A1 | 4/2014 | Aggarwala et al. |
| 2015/0078908 | A1 | 3/2015 | Calza |
| 2015/0139789 | A1 | 5/2015 | Schoenenborn |
| 2015/0260046 | A1 | 9/2015 | Broszat et al. |
| 2016/0017796 | A1 | 1/2016 | Xu et al. |
| 2016/0076392 | A1 | 3/2016 | Thomas |
| 2016/0238034 | A1 | 8/2016 | Fulayter et al. |
| 2017/0159465 | A1 | 6/2017 | Schlemmer et al. |
| 2017/0175761 | A1 | 6/2017 | Schwarz et al. |
| 2017/0175776 | A1 | 6/2017 | Theratil et al. |
| 2018/0038382 | A1 | 2/2018 | Foster |
| 2018/0080450 | A1 | 3/2018 | Glavicic |
| 2019/0101002 | A1 * | 4/2019 | Duffin ............. F04D 29/667 |

FOREIGN PATENT DOCUMENTS

| | | |
|---|---|---|
| EP | 1211383 | 6/2002 |
| EP | 1746249 | 1/2007 |
| EP | 1813773 | 8/2007 |
| EP | 1985803 | 10/2008 |
| WO | 2014/070279 | 5/2014 |
| WO | 2015/041758 | 3/2015 |

OTHER PUBLICATIONS

European Search Report of Application No. 18194668.2 dated Mar. 1, 2019.
European Search Report of Application No. 18194634.4 dated Jan. 29, 2019.
European Search Report of Application No. 18194666.6 dated Feb. 21, 2019.
Smith, Hubert—The Illustrated Guide to Aerodynamics. TAB Books. 2nd Edition, p. 21. (Year: 1992).

* cited by examiner

COMPRESSOR ROTOR WITH COATED BLADES

CROSS-REFERENCE TO RELATED APPLICATIONS

The present application is a continuation of U.S. patent application Ser. No. 15/707,133 filed Sep. 18, 2017, the entire content of which is incorporated herein by reference.

TECHNICAL FIELD

The application relates generally to rotating airfoils for gas turbine engines, and more particularly to mistuned compressor rotors.

BACKGROUND

Aerodynamic and/or vibrational instabilities, such as but not limited to flutter, can occurs in a gas turbine engine when two or more adjacent blades of a rotor of the engine, such as the fan, vibrate at a frequency close to their natural frequency and the interaction between adjacent blades maintains and/or strengthens such vibration. Other types of aerodynamic instability, such as resonant response, may also occur and are undesirable. Prolonged operation of a rotor undergoing such instabilities can cause airfoil stress loads to exceed acceptable levels for operation.

Various attempts have been made to mistune adjacent blades of such rotors so as to separate their natural frequencies and reduce the likelihood of undesirable instabilities. Continuous improvement is nevertheless sought.

SUMMARY

There is accordingly provided a compressor rotor for a gas turbine engine, the compressor rotor comprising blades extending a span length from a central hub, the blades including circumferentially alternating first and second blades having airfoils with corresponding geometric profiles, each of the airfoils including a leading edge, a trailing edge, a root, a tip and a mid-span region between the root and the tip along the span, the airfoil of the first blades having a coating on a first portion of the first blade adjacent the root with a root coating thickness, and the coating being provided on a second portion adjacent the tip of the first blade with a tip coating thickness, the root coating thickness being greater than the tip coating thickness, the coating defining a first coating structure providing the first blade with a first natural vibration frequency different from a second natural vibration frequency of the second blade.

There is also provided a method of manufacturing a compressor rotor of a gas turbine engine, the compressor rotor having a plurality of blades circumferentially distributed around and extending a span length from a central hub, the method comprising the steps of: providing first and second blades respectively having first and second airfoils with corresponding geometric profiles, a leading edge, a trailing edge, a root, a tip, and a mid-span region between the root and the tip along the span; and applying a coating on an outer surface of the first airfoil to form a first coating structure, including applying the coating on a portion of the first airfoil adjacent the root so that the first blade has a root coating thickness and applying the coating on a portion adjacent the tip so that the first blade has a tip coating thickness, the root coating thickness being greater than the tip coating thickness, wherein the first coating structure of the first blade is selected to provide a first natural vibration frequency different from a second natural vibration frequency of the second blade.

There is further provided a compressor rotor for a gas turbine engine, the compressor rotor comprising blades circumferentially distributed around and extending a span length from a central hub, the blades including alternating first and second blades having corresponding geometric profiles, the first blade having an airfoil with a coating thereon within one or more portions thereof and defining a first coating structure, the one or more portions of the airfoil including a radially inner portion of the airfoil adjacent a blade root of the first blade and having a root coating thickness and a radially outer portion of the airfoil adjacent a blade tip of the first blade and having a tip coating thickness, the root coating thickness being greater than the tip coating thickness, the first coating structure of the first blade selected to provide a first natural vibration frequency different from a second natural vibration frequency of the second blade.

There is alternately provided a compressor rotor for a gas turbine engine, the rotor comprising blades circumferentially distributed around and extending a span length from a central hub, the blades including alternating first and second blades having airfoils with a leading edge, a trailing edge, a root, a tip and a mid-span region midway between the root and the tip along the span, the airfoils of the first and second blades having corresponding geometric profiles, the airfoil of the first blades having a coating defining a first coating structure, the coating being provided on at least a portion of the first blade adjacent the root and having a root coating thickness, the mid-span region of the first blade having a mid-span thickness, the coating being provided on a portion adjacent the tip of the first blade and having a tip coating thickness, the root coating thickness being greater than at least one of the tip coating thickness and a coating thickness of the airfoil of the first blade at the mid-span region, the first coating structure of the first blade selected to provide the first blade with a first natural vibration frequency different from a second natural vibration frequency of the second blade.

There is alternately provided a method of manufacturing a compressor rotor of a gas turbine engine, the rotor having a plurality of blades circumferentially distributed around and extending a span length from a central hub, the method comprising the steps of: providing first and second blades respectively having first and second airfoils with corresponding geometric profiles, a leading edge, a trailing edge, a root, a tip, and a mid-span region midway between the root and the tip along the span; and applying a coating on an outer surface of the first airfoil to form a first coating structure, including applying the coating on a portion of the first airfoil adjacent the root to define a root coating thickness and applying the coating on a portion adjacent the tip to define a tip coating thickness, the root coating thickness being greater than at least one of the tip coating thickness and a coating thickness of the airfoil of the first blade at the mid-span region, wherein the first coating structure of the first blade is selected to provide a first natural vibration frequency different from a second natural vibration frequency of the second blade.

There is alternately provided a compressor rotor for a gas turbine engine, the mistuned compressor rotor comprising blades circumferentially distributed around and extending a span length from a central hub, the blades including alternating first and second blades having corresponding geometric profiles, the first blade having airfoil with a coating thereon within one or more portions thereof and defining a first coating structure, the one or more portions of the airfoil including a radially inner portion of the airfoil adjacent a blade root of the first blade and having a root coating thickness and a radially outer portion of the airfoil adjacent a blade tip of the first blade and having a tip coating thickness, the root coating thickness being greater than at least one of the tip coating thickness and a mid-span coating thickness at a mid-span region of the airfoil of the first blade, the first coating structure of the first blade selected to provide a first natural vibration frequency different from a second natural vibration frequency of the second blade.

There is further provided a rotor blade for a compressor rotor of a gas turbine engine, the compressor rotor having alternating blades having corresponding geometric profiles but different coating structures selected to provide different vibration frequencies, the rotor blade comprising an airfoil having a blade root, a blade tip, a coating on one or more portions of the airfoil and defining a first coating structure, the one or more portions of the airfoil including a radially inner portion adjacent the blade root and having a root coating thickness and a radially outer portion adjacent the blade tip and having a tip coating thickness, the root coating thickness being greater than the tip coating thickness.

BRIEF DESCRIPTION OF THE DRAWINGS

Reference is now made to the accompanying figures in which.

DETAILED DESCRIPTION

Figure 1:
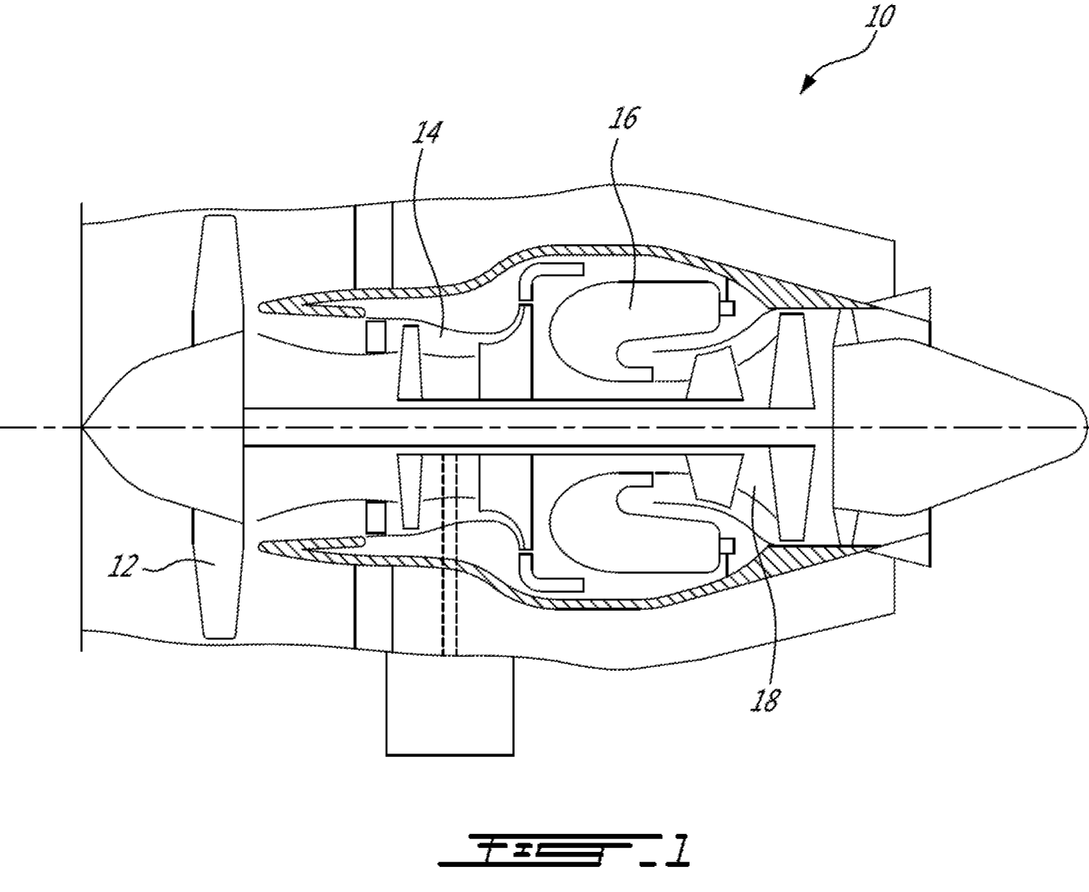
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 also comprises a nacelle for containing various components of engine 10. Although the example below is described as applied to a fan of a turbofan engine, it will be understood the present teachings may be applied to any suitable gas turbine compressor rotor.

A compressor rotor assembly for the gas turbine engine 10 is provided. The rotor assembly as described herein can be the fan 12, or another compressor rotor of the compressor section 14, for example. In one particular embodiment, the fan 12 may be an Integrally Bladed Fan (IBF).

Figure 2:
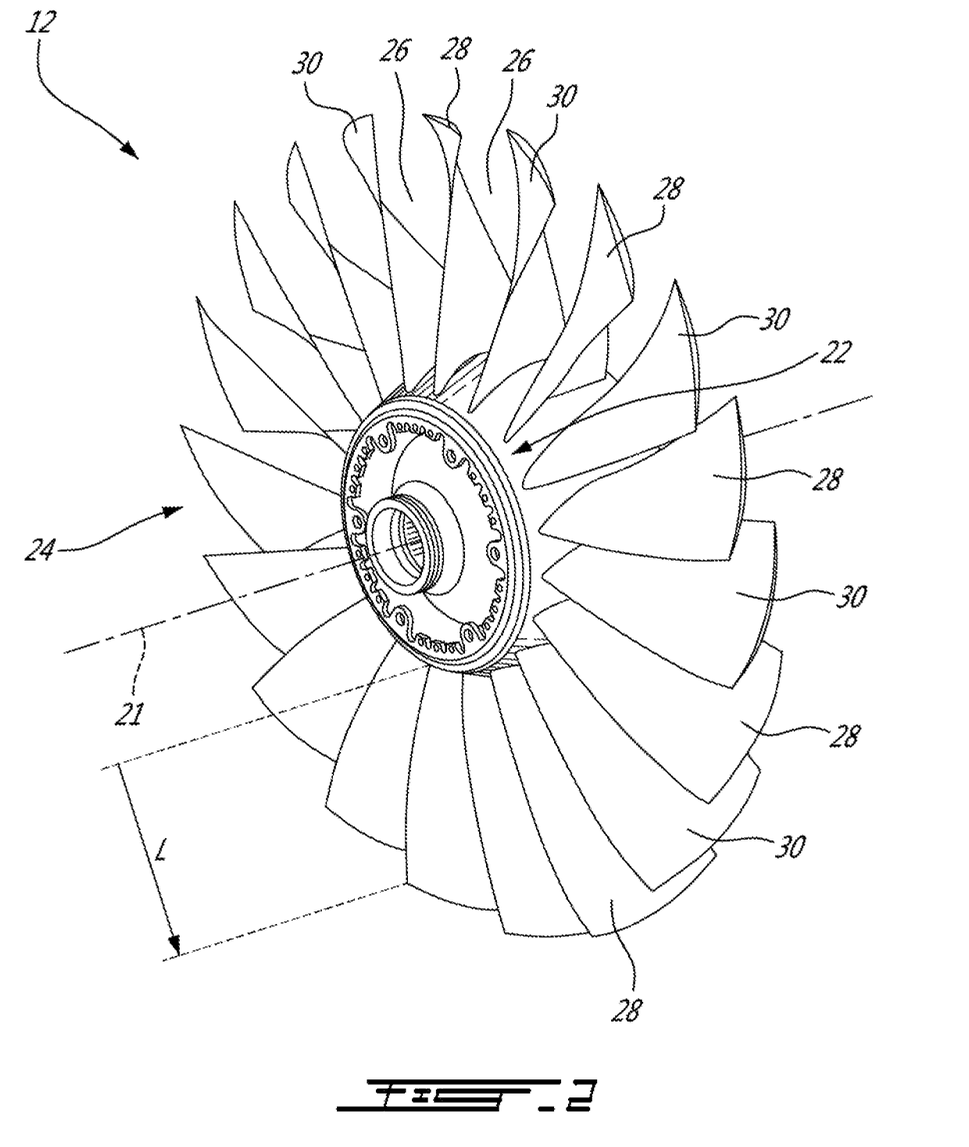
FIG. 2 is a perspective view of a fan rotor of the gas turbine engine shown in FIG. 1.

Referring to FIG. 2, the fan 12 includes a central hub 22, which in use rotates about an axis of rotation 21, and a circumferential row of fan blades 24 that are circumferentially distributed and which project a total span length L from hub 22 in a span-wise direction (which may be substantially radially). The axis of rotation 21 of the fan 12 may be coaxial with the main engine axis 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. Each circumferentially adjacent pair of fan blades 24 defines an inter-blade passages 26 there-between for the working fluid.

In one particular embodiment, the compressor rotor and/or fan 12 as described herein may be a "mistuned" rotor, in which the blades of the rotor are not uniform about the circumference of the rotor and selected/designed such as to ensure a frequency separation between the different blade types.

The circumferential row of fan blades 24 of fan 12 thus includes, in at least one particular embodiment, two or more different types of fan blades 24, in the sense that a plurality of sets of blades are provided, each set having airfoils, which will be described in more details below and illustrated in further figures. It is to be understood, however, that each of these sets of fan blades 24 may include more than two different blade types, and need not comprise pairs, or even numbers, of blade types. For example, each set of fan blades may include three or more fan blades which differ from each other (e.g. a circumferential distribution of the fan blades may include, in circumferentially successive order, blade types: A, B, C, A, B, C; or A, B, C, D, A, B, C, D, etc., wherein each of the capitalized letters represent different types of blades as described above).

The embodiment described below includes, for the sake of simplicity of explanation, a fan 12 having circumferentially alternating sets of fan blades each composed of only two different blade types, namely blades 28 (e.g. blade type "A") and 30 (e.g. blade type "B"). This constitutes, accordingly, a circumferential distribution of fan blades in this example which follows a circumferential sequence of blade types A, B, A, B, etc.

The blades 28 and 30 are geometrically similar and their respective airfoils have corresponding geometric profiles. However, blades 28 and 30 have properties which are different from one another, notably their density and/or stiffness distribution, as will be described and shown in further details below. The different properties of the first and second fan blades 28, 30 provide a natural vibrational frequency separation between the adjacent blades 28 and 30, which may be sufficient to reduce or impede unwanted vibration resonance between the blades (such as bending or torsion vibration, also known as heave and pitch). Regardless of the exact amount of frequency separation, the first and second fan blades 28 and 30 are therefore said to be intentionally "mistuned" relative to each other, in order to reduce the occurrence and/or delay the onset, of flow-induced resonance. It is contemplated that the vibration referred to in the present disclosure is a natural vibration.

Figure 3:
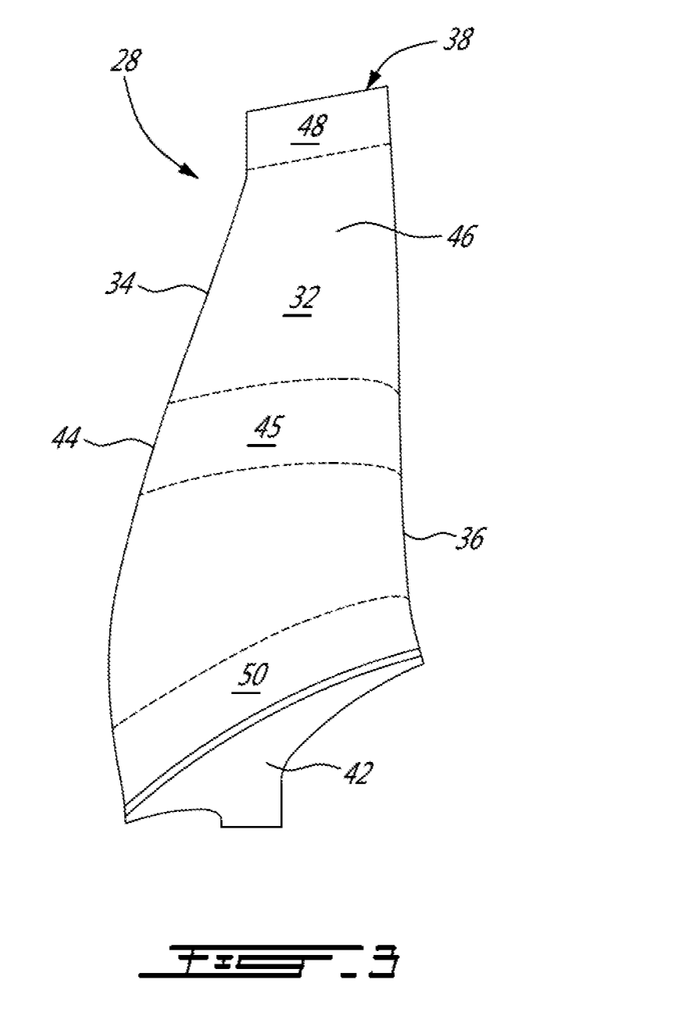
FIG. 3 is a side elevational view a first fan blade of the fan rotor of FIG. 2.

Referring to FIG. 3, the fan blade 28 (blade type "A") of the fan 12, is shown. The fan blade 28 has an airfoil 32 with leading edge 34, trailing edge 36, and tip 38, as well as a root 42 which can have a platform and a blade fixing or dovetail for engaging a fan hub (not shown). The blade 38 also has a mid-span 44 midway between the root 42 and the tip 38 along the span length. A mid-span region 45 of the airfoil is defined about the mid-span 44. Fan blade 30 (blade type "B") is not shown but has an airfoil with a corresponding geometric profile and has therefore a similar geometry.

Flow-induced resonance refers to a situation where, during operation, adjacent vibrating blades transfer energy back and forth through the air medium, which energy continually maintains and/or strengthens the blades' natural vibration mode. Fan blades have a number of oscillation patterns (or vibration modes), any of which, if it gets excited and goes into resonance, can result in flow induced resonance issues. In bending vibration mode there is translational motion, into and out of the direction of blade rotation, at the blade tip. In torsion vibration mode, the blade is deformed by rotation along a longitudinal axis relative to the span length.

The airfoils of the fan blades 28 and 30 comprise a substrate. The substrate can be a metallic substrate selected from one of a titanium, platinum aluminum, nickel and/or iron base substrate. It is understood that the metallic substrate can comprise other materials, such as additives or impurities. The substrate can also be a composite substrate (such as a fiber reinforced plastic) or a non-metallic substrate such as a polymer (polyether ketone or nylon for example).

According to an embodiment of the present disclosure, the airfoil of fan blade 28 has a coating on at least a portion of an outer surface 46 of the substrate forming the airfoil 32. The coating increases the stiffness and/or density of the fan blade 28 in the coated regions. The coating is located on at least a portion of the airfoil 32 adjacent the root 48 (or root portion) and a portion of the airfoil adjacent the tip 50 (or tip portion). In an embodiment, the root and tip portions include the root and the tip, respectively. However the root and tip portions can also be proximate the root and the tip without including the respective root and tip. As illustrated in the embodiment shown of FIG. 3, the coating covers the entire outer surface 46 of airfoil 32. However, in alternate embodiments, the coating can also be located only on portions of the airfoil 32 outer surface 46, namely the portions including at least radially outer portions 48 (proximate the tip 38) and radially inner portions 50 (proximate the hub 42).

The coating is composed of a material that provides increased stiffness and/or density relative to that of the underlying substrate. It is contemplated that the skilled person will choose a suitable type of coating (e.g. metal, nanocrystalline metal, carbon nanotube, composite, ceramic, etc.) as to provide greater stiffness and/or density. In a particular embodiment, the coating is a nanocrystalline metal coating (i.e. a "nano coating"). In one embodiment, the nano coating can be composed of a material different to that of the airfoil substrate. The nano coating can provide for improved structural properties (stiffness and density, for example) and for improved fatigue endurance of the airfoil. The nano coating metal grain size may range between about 2 nm and 5000 nm. The nano coating may be a nickel (Ni), copper (Cu), cobalt-phosphorous (CoP) or another suitable metal or metal alloy, such as Co, Cr, Fe, Mo, Ti, W, or Zr. The nanocrystalline metal coating may be composed of a pure or single metal, such as Ni or Co for example. In a particular embodiment, the nano coating is nickel nano coating. The coating can also comprise a non-metallic coating or a composite coating that can increase stiffness and/or density relative to that of the underlying substrate.

The coating applied on the airfoil defines a blade thickness. On the radially inner portion 50 adjacent the root 42, the coating defines a root coating thickness $T_r$ (hereafter referred to as root thickness $T_r$), and on the radially outer portion 48 adjacent the tip 38, the coating defines a tip coating thickness $T_t$ (hereafter referred to as tip thickness $T_t$). The coating can also be present on the mid-span region 45, as defined herein. In such scenario, the coating defines a coating thickness of the first blade at the mid-span region $T_{ms}$ (hereafter referred to as the "mid-span thickness" $T_{ms}$). The coating has a specific coating structure on the outer surface 32. The root thickness $T_r$, tip thickness $T_t$ and mid-span thickness $T_{ms}$ are defined as the distance between the outer surface 46 forming the substrate of the airfoil 32 and an outer surface of the coating. In other word, the different thicknesses described herein refer to the thicknesses of the coating layer applied on the substrate on the corresponding location. It is understood that where no coating is applied the thickness will be zero. As used herein, the term "coating structure" refers to the arrangement and distribution of the coating on the airfoil, i.e. the location, the shape and the thickness of the coating layer.

In one embodiment, the root thickness $T_r$ of blade 28 is greater than one or both of the tip thickness $T_t$ and the mid-span thickness $T_{ms}$. For example, the root thickness $T_r$ can be greater than the tip thickness $T_t$ and the mid-span thickness $T_{ms}$, or the root thickness $T_r$ can be greater than the mid-span thickness $T_{ms}$ while being equal to the tip thickness $T_t$. In certain embodiments, the root thickness $T_r$ is not lower than any other thickness over the outer surface of the airfoil. However, in alternate embodiments, when bending frequency may wish to be adjusted for example, mass is added to the blade tip only so that $T_r$ is zero or $T_r$ is less than $T_t$.

The root thickness $T_r$, tip thickness $T_t$ and mid-span thickness $T_{ms}$ can be the same over an entire circumferential outer surface of the root portion, tip portion and mid-span region, respectively. However, the root thickness $T_r$, tip thickness $T_t$ and mid-span thickness $T_{ms}$ can also be different at the trailing edge and leading edge than on the side airfoil faces (i.e. the portions of the airfoil on the suction side and the pressure side thereof extending from the leading edge to the trailing edge on both sides of the airfoil) of the root portion, tip portion and mid-span region, respectively.

The coating on the airfoil increases the stiffness and/or density of the blade on the coated region. The stiffness distribution and/or density distribution of the blade 28 is therefore different from that of the same airfoil without the coating. Such difference of stiffness and/or density distribution causes a change in a natural vibration frequency of the fan blade 28 relative to the corresponding natural vibration frequency of the airfoil without coating. The vibration frequency can be one of the bending mode vibration frequency and the torsion mode vibration frequency.

Blade 30 can also comprises a coating, as described herein. However, the coating on blade 30 is present, if at all, in lower amount than on blade 28 such that the change in stiffness and/or density distribution, and consequently in natural vibration frequency, is different than for blade 28. Therefore, if blade 30 has a coating, the coating structure of blade 30 is different from the coating structure of blade 30. That is, at least one of the location, the shape, and/or the thickness of the coating layer may be different. Blade 30 can also be free from coating so that the natural vibration frequency is that of the airfoil. As a result, blade 28 has a first natural vibration frequency and blade 30 has a second natural vibration frequency that is different from the first natural vibration frequency. There is therefore a frequency separation between blade 28 and blade 30, without a significant change is the geometry of blades 28, 30. The frequency separation can be used to dampen potential flutter or resonance between blades 28 and 30 and to prevent potential damages due to such vibration instabilities.

Considering that the airfoils of blades 28 and 30 have corresponding geometric shapes/profiles, the different coating thicknesses (i.e. at least $T_r$, $T_t$, $T_{ms}$) lead to small differences between the shapes/profiles of the blades 28, 30. However, the coating applied may only cause slight changes in the blade geometry, and massive changes may be avoided. It is understood that the portions 48 and 50, and of the mid-span region 45, illustrated by the dashed lines in FIG. 3, can be of any suitable size and/or shape, which can be determined by the skilled practitioner depending on at least the vibration mode considered, the nature of the airfoil substrate, and the nature of the coating.

Figure 4A:
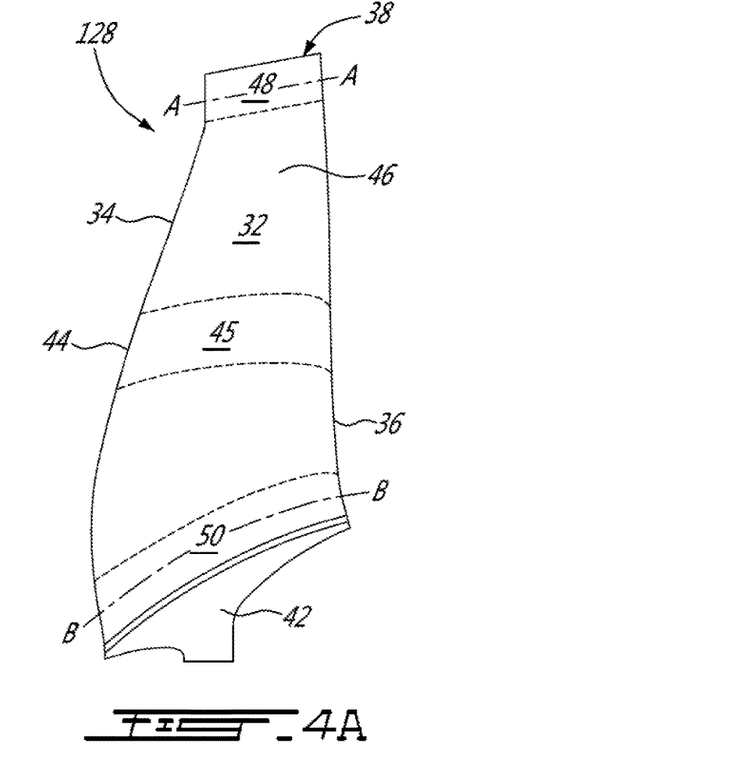
FIG. 4A is a side elevational view the first fan blade of the rotor of FIG. 2, according to an embodiment of the present disclosure.
Figure 4B:
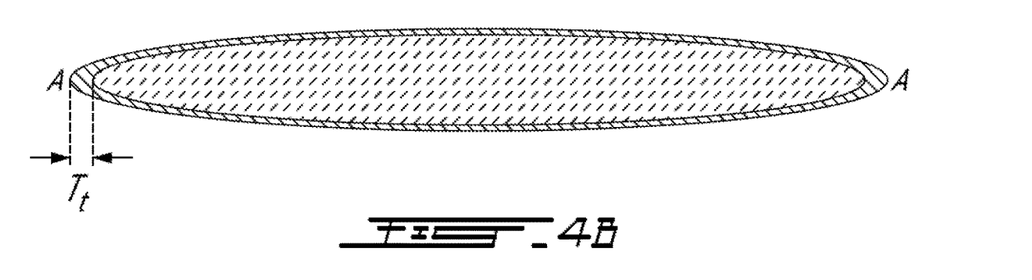
FIG. 4B is a cross-sectional views of the first fan blade of FIG. 4A along axis A-A.
Figure 4C:
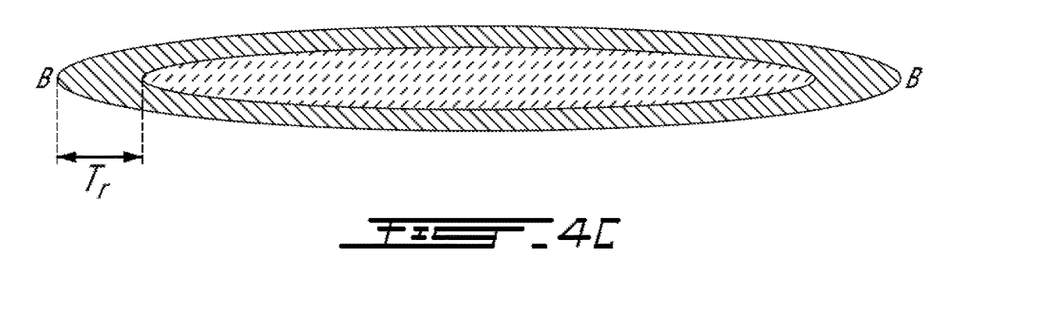
FIG. 4C is a cross-sectional views of the first fan blade of FIG. 4A along axis B-B.
Figure 5A:
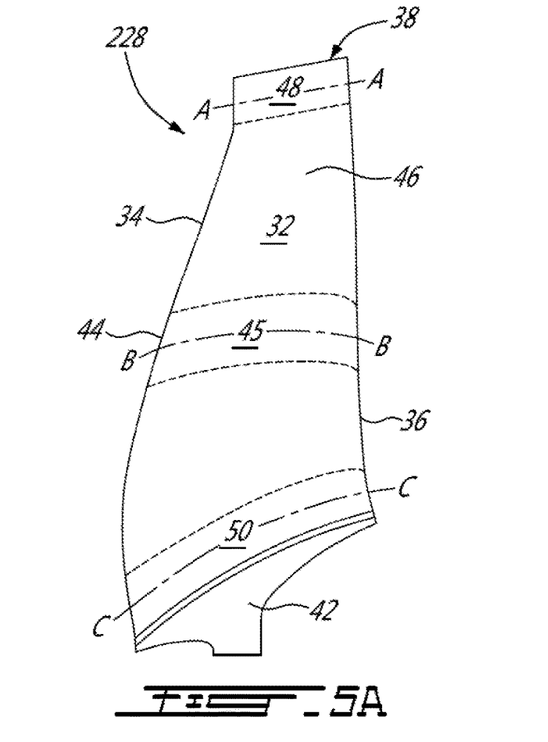
FIG. 5A is a side elevational view the first fan blade of the rotor of FIG. 2, according to an embodiment of the present disclosure.
Figure 5B:
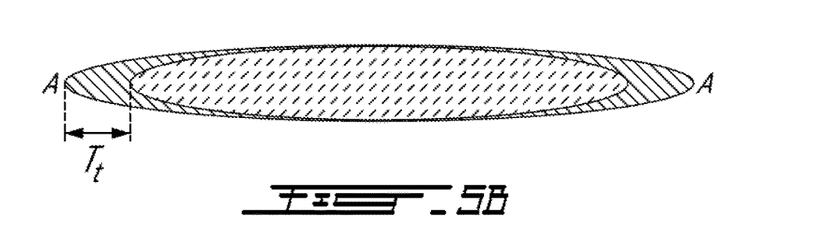
FIG. 5B is a cross-sectional views of the first fan blade of FIG. 5A along axis A-A.
Figure 5C:
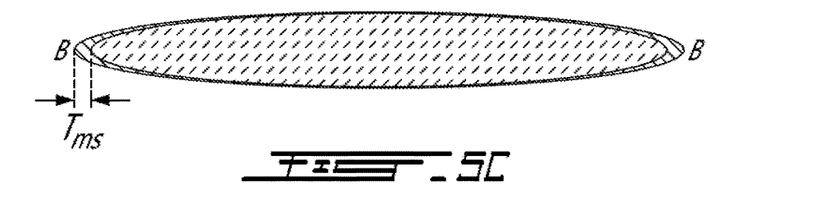
FIG. 5C is a cross-sectional views of the first fan blade of FIG. 5A along axis B-B.
Figure 5D:
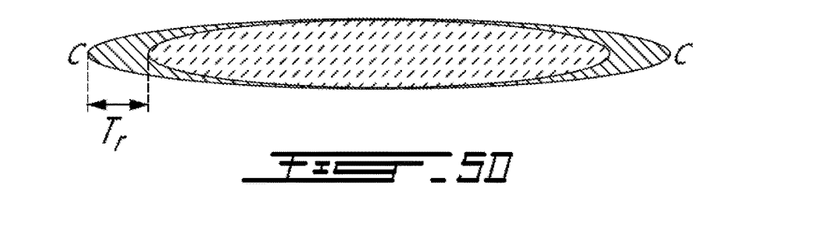
FIG. 5D is a cross-sectional view of the first fan blade of FIG. 5A along axis C-C.

Referring to FIGS. 4A-4C, a blade 128 in accordance with a particular is shown, where elements similar to that of the blade 28 are referred to using the same reference numeral and will not be described further herein. In the particular embodiment of FIG. 4A, as illustrated by the cross sectional views taken along the axes A-A and B-B (FIGS. 4B and 4C, respectively), the root thickness $T_r$ of blade 128 is greater than the tip thickness $T_t$ of the blade 128. In other words a thicker layer of coating is present toward the root (over a circumferential outer surface of root portion 50) than toward the tip (over a circumferential outer surface tip portion 48). It is understood that the coating on blade 130 (not shown, similar to blade 30) can be located similarly than on blade 128 (i.e. following a similar pattern, i.e. location and shape), but still in a lower amount so that the coating structure of blade 128 is different from the coating structure of blade 130. The coating can also be located uniformly over the whole airfoil of the blade 130 or can be located following any other suitable pattern. Further, blade 130 can be free of coating. In any scenario, the bending vibration response of blade 128 is changed and a vibrational frequency separation is created between blade 128 and blade 130.

Referring to FIGS. 5A-5D, a blade 228 in accordance with another embodiment is shown, where elements similar to that of the blade 28 are referred to using the same reference numeral and will not be described further herein. In the particular embodiment of FIG. 5A, as illustrated by the cross sectional views taken along the axes A-A, B-B, and C-C (FIGS. 5B to 5D, respectively), the root thickness $T_r$ and the tip thickness $T_t$ on the trailing and the leading edges of the blade 228 is greater than the mid-span thickness $T_{ms}$ on the trailing and the leading edges of the blade 228. In other words a thicker layer of coating is present on the leading edge and the trailing edge toward the root (along the height of the root portion 50) and toward the tip (along the height of the tip portion 48) and a thinner layer of coating is present on the leading edge and trailing edge at the mid-span region 45. It is understood that the coating on blade 230 (not shown, similar to blade 30) can be located similarly than on blade 228 (i.e. following a similar pattern, i.e. location and shape), but still in a lower amount, so that the coating structure of blade 228 is different from the coating structure of blade 230. The coating can also be located uniformly over the whole airfoil of the blade 230 or can be located following any other suitable pattern. Further, blade 230 can be free of coating. In any scenario, the torsion vibration response of blade 228 is changed and a vibrational frequency separation is created between blade 228 and blade 230.

A method of manufacturing a compressor rotor assembly for a gas turbine engine is also provided. The compressor rotor assembly is as defined herein and comprises a plurality of blades each having an airfoil. The airfoils are circumferentially distributed around and extend a span length from a central hub. The blades include successively alternating type "A" blade and type "B" blade. Type "A" blade and type "B" blade are provided with corresponding geometric profiles, as defined herein.

Coating as defined herein is applied on at least an outer surface of the airfoil of type "A" blade, as to change the vibrational response (frequency) of at least type "A" blade. The coating is applied on at least portions a portion adjacent the root and a portion adjacent the tip. Applying the coating comprises forming a coating layer on the outer surface of the airfoil of type "A" blade, thereby defining at least a root thickness and a tip thickness delimited between an outer surface of the airfoil and an outer surface of the coating layer. In one embodiment, the coating layer on the portion adjacent the root is thicker than the coating layer in one or both of the portion adjacent the tip and the mid-span region, so that the root thickness is greater than one or both of the tip thickness and mid-span thickness. The coating is therefore applied to form a coating structure that induces a change in the vibrational response of the blade, relative to an airfoil without coating or with less coating.

In one embodiment, the coating is applied in greater amount (i.e. a thicker coating layer) on the portion adjacent the root than on the portion adjacent the tip. The root thickness is therefore greater than the tip thickness. In another embodiment, the coating is applied in greater amount (i.e. a thicker coating layer) on the leading and trailing edges of the portions adjacent the root and the tip than on the leading and trailing edges of the mid-span region.

In one embodiment, the coating is applied on type "A" blade only, and type "B" blade is kept free of coating. Therefore, the stiffness and/or density distribution of type "A" blade and type "B" blade, as well as their respective vibration responses (frequencies), are different. In another embodiment the coating can also be applied on type "B" blade, but in a lower amount so that a coating structure of type "B" blade is different from the coating structure of type "A" blade and the stiffness and/or density distribution of type "A" blade and type "B" blade, as well as their respective vibration responses (frequencies), are different. The coating can be applied on the entire outer surface of the airfoil of type "B" blade. The coating can also be applied following type "A" blade coating pattern or any other suitable coating pattern, depending on at least the vibration mode considered, the nature of the airfoil substrate, and the nature of the coating.

The coating may be applied, according to the present method, through a plating process in a bath, such as to apply the fine-grained (i.e. nano-scale) metallic coating to the component or article to be coated. However, it is understood that any suitable plating or other coating process, can be used. The coating can for example be applied using the method described in U.S. Pat. No. 8,871,297, which is incorporated herein by reference.

The above description is meant to be exemplary only, and one skilled in the art will recognize that changes may be made to the embodiments described without departing from the scope of the invention disclosed. Any suitable base metals, polymers or other materials may be used as the substrate material, and any suitable metal and/or metal combinations may be selected for the coating. Any suitable manner of applying the coating layer may be employed. Still other modifications which fall within the scope of the present invention will be apparent to those skilled in the art, in light of a review of this disclosure, and such modifications are intended to fall within the appended claims.

The invention claimed is:

1. A compressor rotor for a gas turbine engine, the compressor rotor comprising blades extending a span length from a central hub, the blades including circumferentially alternating first and second blades having airfoils with corresponding geometric profiles, each of the airfoils including a leading edge, a trailing edge, a root, a tip and a mid-span region between the root and the tip along the span, the airfoil of the first blades having a coating on a first portion of the first blade adjacent the root with a root coating thickness, and the coating being provided on a second portion adjacent the tip of the first blade with a tip coating thickness, the root coating thickness being greater than the tip coating thickness, the coating defining a first coating structure providing the first blade with a first natural vibration frequency different from a second natural vibration frequency of the second blade.

2. The compressor rotor as defined in claim 1, wherein the coating is provided on the mid-span region of the airfoil of the first blades.

3. The compressor rotor as defined in claim 2, wherein the coating on the mid-span region has a mid-span coating thickness, the root coating thickness being greater than the mid-span coating thickness.

4. The compressor rotor as defined in claim 1, wherein the airfoil of the second blade is free of coating.

5. The compressor rotor as defined in claim 1, wherein the airfoil of the second blade has a coating defining a second coating structure, the coating being provided on at least a portion adjacent the root of the second blade and having a root coating thickness, the coating being provided on a portion adjacent the tip of the second blade and having a tip coating thickness, the root coating thickness being greater than the tip coating thickness, the second coating structure of the second blade defining the second natural vibration frequency that is different from the first natural vibration frequency.

6. The compressor rotor as defined in claim 5, wherein the coating defining the second coating structure is disposed on the mid-span region of the airfoil of the second blades with a mid-span coating thickness.

7. The compressor rotor as defined in claim 6, wherein the root coating thickness on the airfoil of the second blades is greater than the mid-span coating thickness thereon.

8. The compressor rotor as defined in claim 2, wherein the root coating thickness and the tip coating thickness on the trailing and the leading edges of the first blade is greater than the coating thickness of the airfoil at the mid-span region on the trailing and the leading edges of the first blade.

9. The compressor rotor as defined in claim 1, wherein the first and the second airfoil comprise a titanium based substrate or platinum based substrate.

10. The compressor rotor as defined in claim 1, wherein the coating is a nano-coating.

11. The compressor rotor as defined in claim 10, wherein the nano-coating is a nickel nano-coating.

12. The compressor rotor as defined in claim 10, wherein the compressor rotor is a fan.

13. A method of manufacturing a compressor rotor of a gas turbine engine, the compressor rotor having a plurality of blades circumferentially distributed around and extending a span length from a central hub, the method comprising the steps of:
providing first and second blades respectively having first and second airfoils with corresponding geometric profiles, a leading edge, a trailing edge, a root, a tip, and a mid-span region between the root and the tip along the span; and
applying a coating on an outer surface of the first airfoil to form a first coating structure, including applying the coating on a portion of the first airfoil adjacent the root so that the first blade has a root coating thickness and applying the coating on a portion adjacent the tip so that the first blade has a tip coating thickness, the root coating thickness being greater than the tip coating thickness, wherein the first coating structure of the first blade is selected to provide a first natural vibration frequency different from a second natural vibration frequency of the second blade.

14. The method as defined in claim 13, wherein the coating is applied only on the first airfoil.

15. The method as defined in claim 13, wherein the coating is applied on an outer surface of the second airfoil to form a second coating structure, the coating being applied on at least a portion adjacent the root so that the second blade has a root coating thickness and a portion adjacent the tip so that the second blade has a tip coating thickness, the root coating thickness being greater than the tip coating thickness, wherein the second coating structure of the second blade is selected to provide the second natural vibration frequency that is different from the first natural vibration frequency.

16. The method as defined in claim 13, further comprising applying the coating to the mid-span region of the first airfoil, and wherein the coating is applied so that the root coating thickness and the tip coating thickness on the trailing and the leading edges of the first airfoil is greater than a coating thickness at the mid-span region on the trailing and the leading edges of the first blade.

17. A compressor rotor for a gas turbine engine, the compressor rotor comprising blades circumferentially distributed around and extending a span length from a central hub, the blades including alternating first and second blades having corresponding geometric profiles, the first blade having an airfoil with a coating thereon within one or more portions thereof and defining a first coating structure, the one or more portions of the airfoil including a radially inner portion of the airfoil adjacent a blade root of the first blade and having a root coating thickness and a radially outer portion of the airfoil adjacent a blade tip of the first blade and having a tip coating thickness, the root coating thickness being greater than the tip coating thickness, the first coating structure of the first blade selected to provide a first natural vibration frequency different from a second natural vibration frequency of the second blade.

18. The compressor rotor as defined in claim 17, wherein the airfoil of the second blade is free of coating.

19. The compressor rotor as defined in claim 17, wherein the airfoil of the second blade has a coating defining a second coating structure, the coating being located on at least a portion adjacent the root of the second blade and having a root coating thickness and a portion adjacent the tip of the second blade and having a tip coating thickness, the root coating thickness being greater than the tip coting thickness, the second coating structure of the second blade selected to provide the second natural vibration frequency that is different from the first natural vibration frequency.

20. The compressor rotor as defined in claim 17, wherein the coating is provided on the mid-span region of the first airfoil with a mid-span coating thickness, the root coating thickness and the tip coating thickness on the trailing and the leading edges of the first blade is greater than the mid-span coating thickness at the mid-span region on the trailing and the leading edges of the first blade.

* * * * *